United States Patent [19]

Saito

[11] 4,038,915
[45] Aug. 2, 1977

[54] APPARATUS FOR PEELING A FLESH OF VEGETABLES TO FORM A TAPE-LIKE FLESH

[76] Inventor: Shoji Saito, No. 3-12-9, Shin-chiba, Chiba, Chiba, Japan

[21] Appl. No.: 666,140

[22] Filed: Mar. 11, 1976

[30] Foreign Application Priority Data

July 22, 1975 Japan .......................... 50-101385[U]

[51] Int. Cl.$^2$ .......................... A23N 7/00; B26D 7/06
[52] U.S. Cl. .................................. 99/594; 83/411 R; 83/915.5
[58] Field of Search .......................... 99/594, 596–599, 99/541; 83/411 R, 733, 915.5, 647

[56] References Cited

U.S. PATENT DOCUMENTS 430,139   6/1890   Meyer ..................................... 99/598

Primary Examiner—Harvey C. Hornsby
Assistant Examiner—Robert Pous
Attorney, Agent, or Firm—Eliot S. Gerber

[57] ABSTRACT

An apparatus is provided, in which a vegetable is rotated whereas a blade is reciprocated under pressure on the vegetable, to form a tape-like flesh which is used for various kinds of dishes.

4 Claims, 11 Drawing Figures

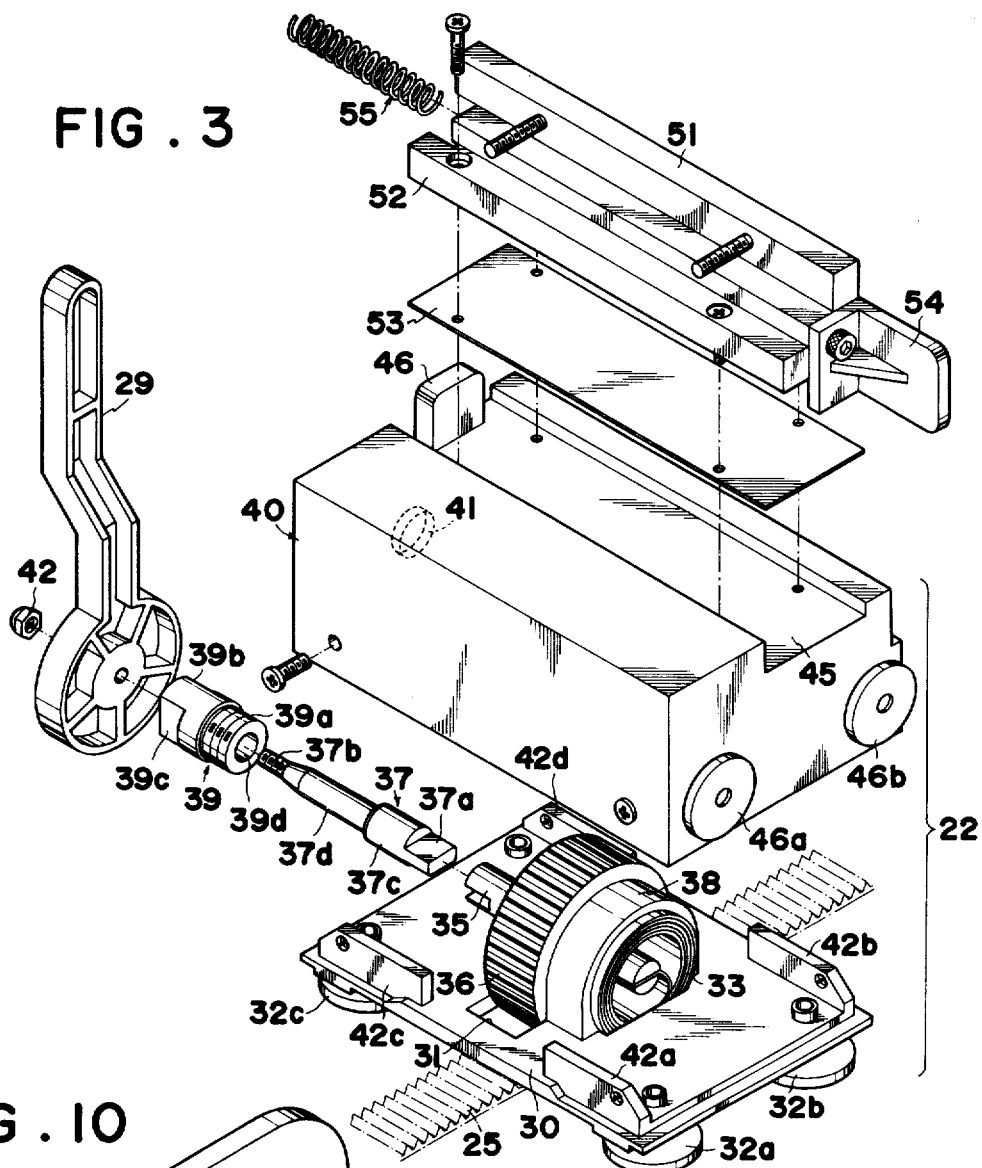
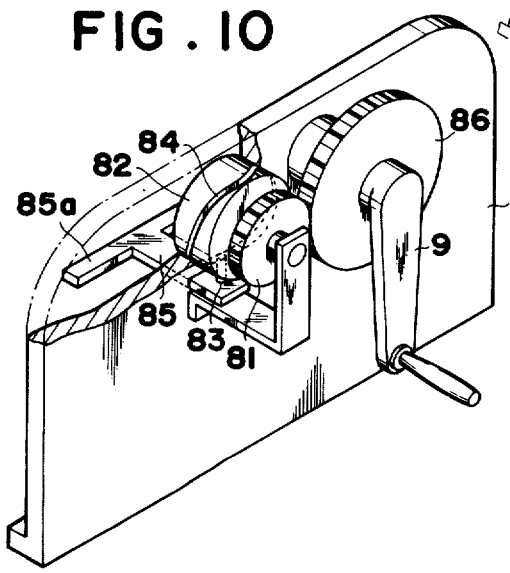

APPARATUS FOR PEELING A FLESH OF VEGETABLES TO FORM A TAPE-LIKE FLESH

BACKGROUND OF THE INVENTION

The present invention relates to an apparatus for cutting vegetables, and more particularly to a new apparatus for rotary-cutting or peeling a flesh of round shaped or preferably a cylindrical vegetables to produce a tape-like thin flesh of the vegetables as radishes, carrots, etc.

The rotary-cutting in the field of cooking is generally called as "Katsura-muki" by Japanese and cooks and housewives is familiar in the Japanese dishes as vinegard dishes and the like, wherein the produced thin flesh is used both for decoration of dishes and for food itself and will be applied for western-style cooking. However, as we have, in Japan, a saying that "Katsura-muki (rotary cutting) needs 3 years' training", which means that it takes three years for a man to manually produce a favorably thin flesh of vegetables in the form of a tape-like product. Namely, it requires experience and skills to produce a thin flesh of vegetable as required with a vegetable to be sliced in one hand and a knife in the other.

Accordingly, an object of the present invention is to provide a novel apparatus for rotary-cutting a flesh of vegetables to produce a thin tape-like flesh thereof.

Another object of the present invention is to produce a rotary cutting apparatus for vegetables which is simple in construction and operated with ease.

Further object of the present invention is to provide a rotary-cutting apparatus for vegetables, which allows to produce a thin tape-like flesh of vegetables with smooth surfaces.

Further object of the present invention is to provide a rotary-cutting apparatus for vegetables, which allows to form a uniform tape-like flesh as thin as 0.5 mm.

Another object of the present invention is to provide a rotary-cutting apparatus for vegetables, which allows to select and change the thickness of the tape-like flesh as desired.

Another object of the present invention is to provide a rotary-cutting apparatus for vegetables, which permits to form a desired product with one-hand operation.

DISCRIPTION OF THE DRAWINGS

FIG. 3 is a perspective view a preferred pressing device, parts being taken apart, of the apparatus;

FIG. 8 shows a preferred construction of the skewer;

FIG. 10 is a perspective view of another embodiment of driving mechanism in the present apparatus.

DETAILED DESCRIPTION OF THE INVENTION

Figure 1:
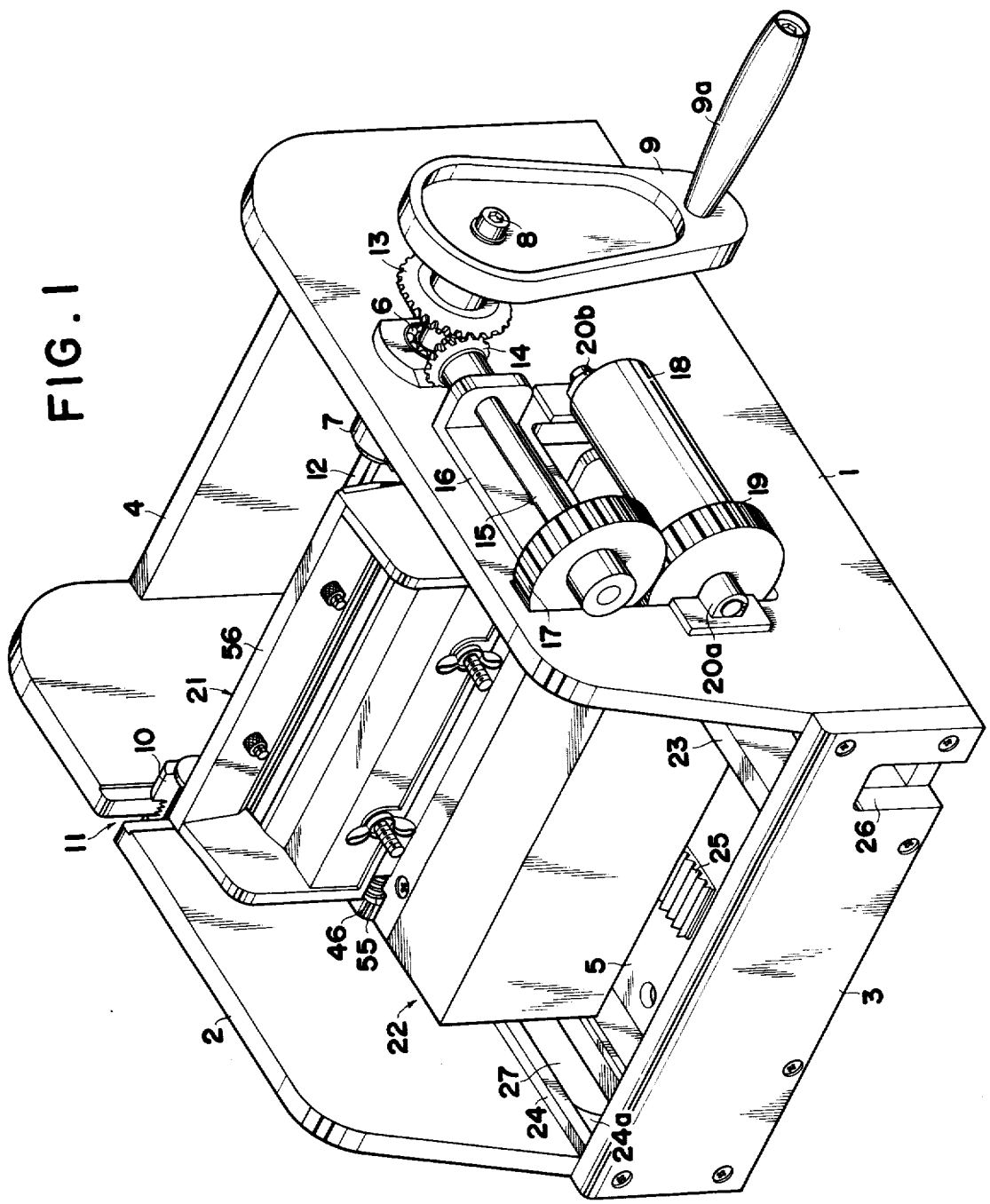
FIG. 1 is a perspective view of an apparatus embodying the present invention.
Figure 2:
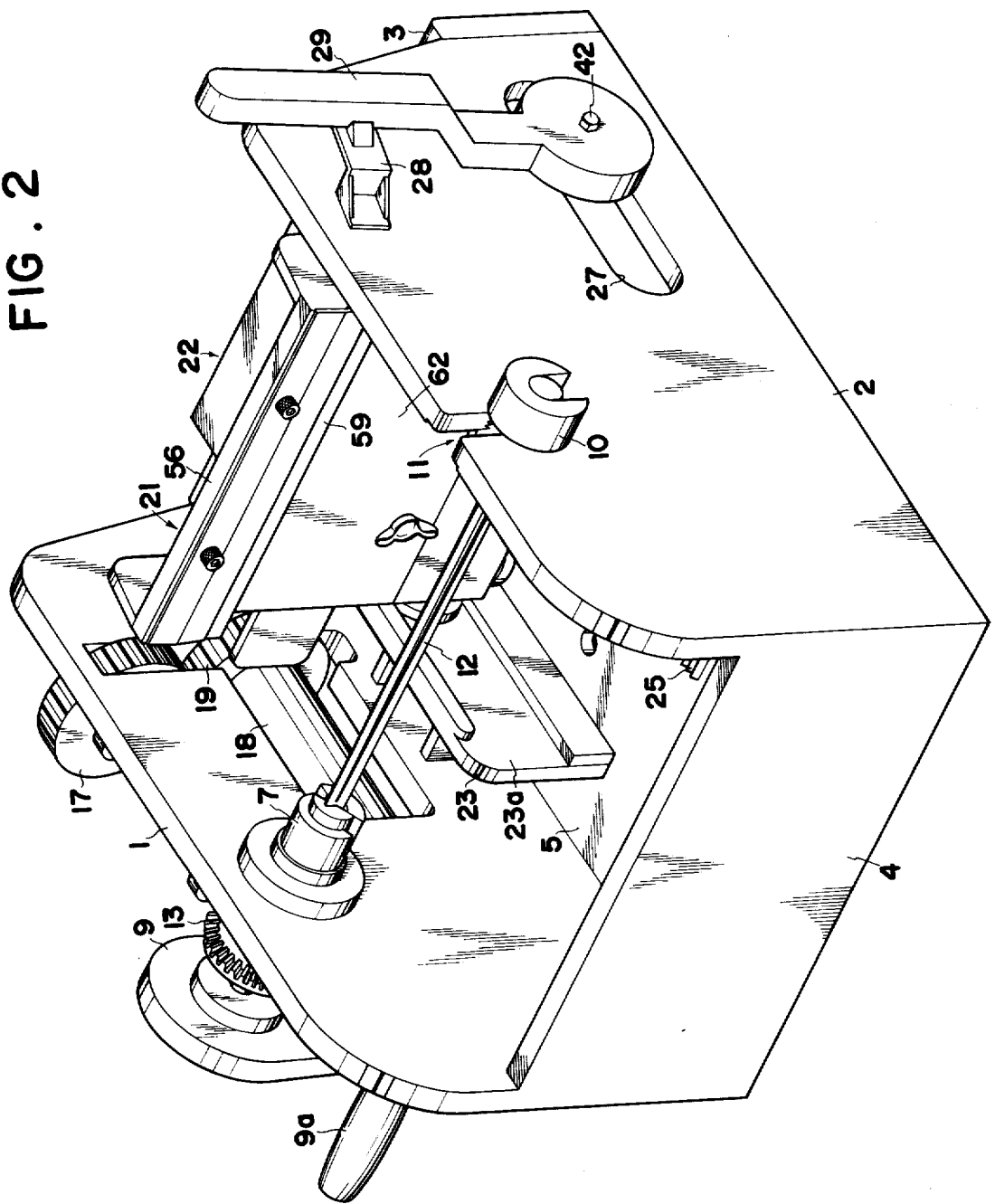
FIG. 2 is a perspective view of the other side of the apparatus shown in FIG. 1.

In FIGS. 1 and 2, the present apparatus has a first wall 1 and a second wall, the both of which is erected oppositely to each other by a front plate 3, a rear plate 4 and a base plate 5, to form a box-like configuration. These members 1, 2, 3, 4 and 5 are made of synthetic resin materials. The front plate 3 is removably connected to the walls 1, 2 and base plate 5, as shown by screws.

The first wall 1 has a ball-bearing 6 fixed at the upper portion, and a first securing device 7 on the interior surface of the wall so that the both 6 and 7 are exially aligned with each other. A shaft 8 is journaled on the ball-bearing 6 and connected at one end to the first securing member 7, and also connected at the other end to a handle 9 which has a grip 9a. Similarly, the second wall has a second securing device 10 at the upper portion, opposite to the first securing device 7. The second securing device 10 is composed of two members 10a and 10b as well shown in FIG. 7 and is positioned at the lowest end of a recess 11 which is formed for the purpose of an easy installment of the second securing device 10. The first securing device 7 so well as the shaft 8 is axially aligned with the second securing device 10, so that a skewer 12, which will be described below, is secured at its both ends by the two securing devices 7 and 10, and that the driving operation of the handle 9 rotates the skewer 12 axially. Further, a toothed wheel (i.e., pinion) 13 is fixed to the shaft 8 between the ball-bearing 6 and the handle 9, as shown in FIG. 1.

Another toothed wheel (i.e., gear) 14 is disposed, which is meshed with the toothed wheel 13 to form a "bevel gear". As well illustrated in FIG. 1, the axis of the toothed wheel 14 is perpendicular to that of the toothed wheel 13. In this embodiment of the invention, a gear ratio of the bevel gear 13 and 14 is 2:1 so that one rotation of the toothed wheel 13 makes two rotations of the toothed wheel 14. The toothed wheel 14 is connected to an end of a shaft 15 which is journaled on a supporting member 16 fixed on the first wall 1. A toothed wheel 17 is fixed to the other end of the shaft 15. In parallel alignment with the shaft 15, an eccentric rotary shaft 18 is disposed below the shaft 15. The rotary shaft 18 has a toothed wheel 19 which is engaged with the toothed wheel 17 of the shaft 15. The eccentric rotary shaft 18 as well as the toothed wheel 19 is journaled on a pair of bearings 20a and 20b. Thus, the operation of the handle 9 delivers the rotary movement to the eccentric rotary shaft 18 by way of the bevel gear construction (13, 14) and the two toothed wheels 17 and 19.

The skewer 12, which is to be secured by the first and second securing devices 7 and 10, is a sword-shape and has cylindrical haft portion which is to be secured into the second sewing device. The haft portion is of help to insert the skewer through an axis of a vegetables such as raddish with hand. The skewer has a sharp end opposite to the haft portion thereof and is long enough to support a vegetable and bridges the two securing device 7 and 10. The skewer member 12 will be described later with reference to FIG. 7.

Within the rectangular box-like configuration of the walls 1, 2 and plates 3, 4 and the base plate 5, there are provided a cutting device 21 which is reciprocated in the direction parallel to the axis of the shaft 8, and a device 22 for pressing the cutting device onto the rotary surface of the vegetable under a uniform pressure.

In FIGS. 1 and 2, two longitudinal guide members 23 and 24 are disposed on the lower interior of the box-shaped configuration, namely on the first wall 1 and the second wall 2, so that the two guide members 23, 24 are aligned with, and parallel to, each other. The guide members 23, 24 each has recesses 23a and 24a along the lengthwise direction so that the recessed area allows wheels of the pressing device 22, which will be described below with reference to FIG. 3, to move along the recessed area. The recessed area should have a width substantially equal to the diameter of the wheels so that the wheels may snugly be positioned within the recessed area.

The base plate has, at the center portion, a rack 25 which is formed integral with the base plate 5 in a manner parallel to the guide members 23 and 24. Further, the front plate 3 of the box-shaped configuration has a recess 26 for the purpose of locking the apparatus on a table or the like, but the device for stationary positioning the apparatus is known and is not a subject matter of the present invention and, therefore, a detailed description will not be presented. The second wall 2 has an elongated window 27 at the lower portion thereof, and a stopper 28 at the upper portion thereof for temporarily holding a lever 29 which will be described in detail as well as the mechanism of pressing device 22.

In FIGS. 1, 2 and 3, the latter showing the construction of the pressing device 22, a base 30 has a hole 31 at the center thereof and four guide rollers 32a, 32b, 32c, 32d (not shown) at the corner thereof so that the axis of the four guide rollers are perpendicular to the plane of the base 30, as well shown in FIG. 3. A clockwork spring 33 and a toothed wheel 36 are disposed at the hole 31 and are connected to a shaft member 35 which is journaled on a bearing member (not shown). More specifically, the inner end of the spring 33 is connected to an end portion of the shaft member 35 whereas the outer end of the spring 33 is connected to the base 30, and the toothed wheel 36 is axially connected to the middle portion of the shaft member 35. The shaft member 35 is journaled on the bearing member, as described, which member 36 is integrally formed on the base 30. The other end of the shaft has a concave so that a convex or projection 37a of a second shaft member 37 will be snugly fit in the concave of the shaft member 35. The shaft members 35 and 37 are divided into two sections, as described, for the purpose of easy assembling. The spring 33 is covered by an arc shaped cover member 38 which is disposed integral to the base 30. The second shaft member 37 has an threaded groove 37b at the end opposite to the projection 37a, a first cylindrical portion 37c adjacent to the projection 37a, and a second cylindrical portion 37d between the first cylindrical portion 37c and the threaded groove 37b. The first cylindrical portion 37c is larger in diameter than the second cylindrical portion 37d. At the second cylindrical portion 37d, there is provided a tube member 39 which has a cylindrical portion 39a having a threaded groove which is to be engaged with a threaded hole (illustrated by phantom lines at 41 in FIG. 3) of a casing member 40 which will be described below. The cylindrical portion 39a is smaller in diameter than the principal portion of the tube member 39. The tube member 39 has a flat portions 39b and 39c for the purpose of easy fingertip assembling and disassembling. A through hole 39d has a diameter larger enough than the diameter of the second cylindrical portion 37d of the second shaft 37 but smaller than the diameter of the first cylindrical portion 37c. The lever member 29 is provided at the end portion of the second shaft member 37 in a close contact with the tube member 39 and fixed by means of a nut 42 which will be engaged with the threaded groove 37b of the second shaft member 37. Thus, the spring 33 is operatively connected to the lever member 29, by way of the members 35, 37 and 39, and the toothed wheel 36 is engaged with the rack 25 which is integrally formed on the base plate 5.

Further, the pressing device has four blocks 42a, 42b, 42c, 42d, each having a threaded hole, integrally formed at the corner of the base 30, and a casing 40. The casing 40 has an elongated recessed area 45 for securing a cutting device, which will be described below, a wall 46 at the end portion of the recessed area 45, and four wheels 46a, 46b, 46c, 46d (the latter two being not shown) at the both sides. The casing 40 is connected to the base 30 by screws which will engage with the threaded holes of the blocks 42a, 42b, 42c, 42d. The second shaft member 37, which is connected to the first shaft member, is supported by the tube member 39 which is threadedly connected to the casing 40 by means of the cylindrical portion 39a of the tube member 39 and the threaded hole 41 of the casing 40. On the recessed are 45 of the casing 40, a cutting device is positioned, a part of the cutting device being illustrated in FIG. 3, and the cutting device will be described with reference to FIGS. 4 and 5.

Figure 4:
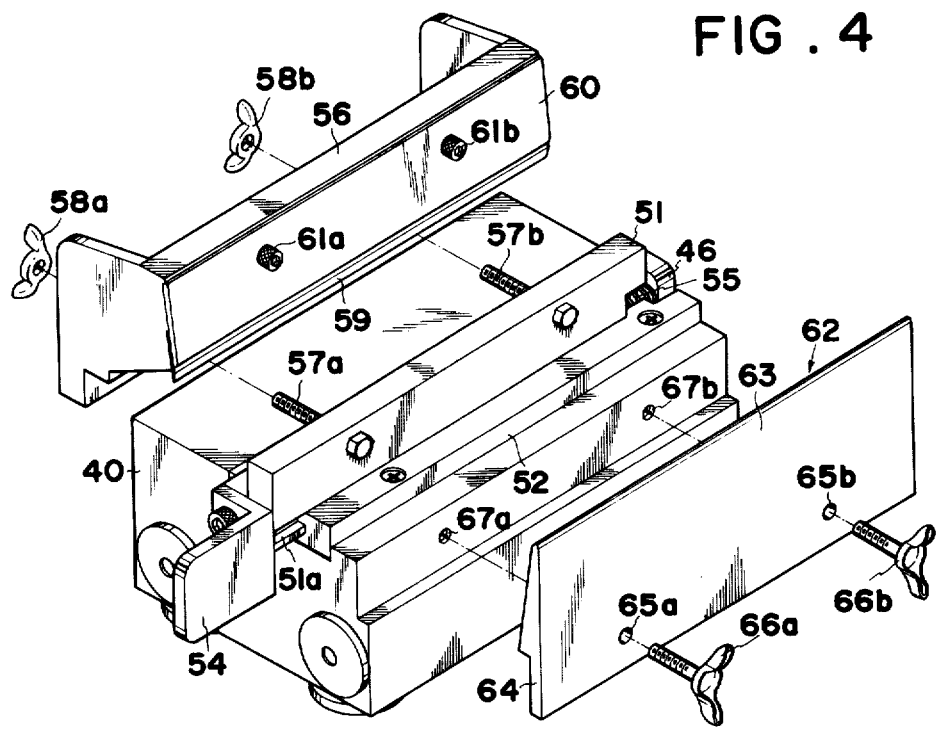
FIG. 4 is a perspective view of a part of the apparatus of the present invention.
Figure 5:
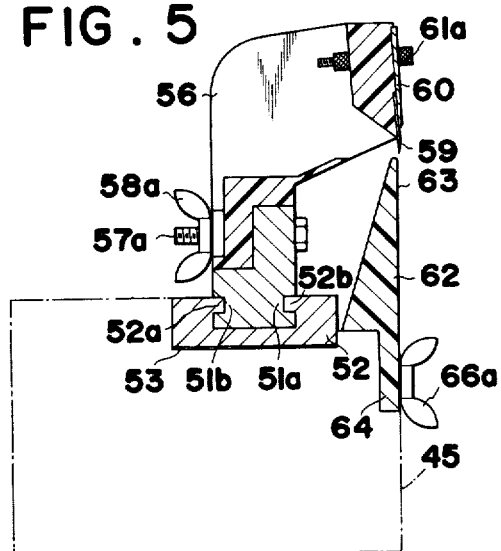
FIG. 5 is a sectioned view of the part shown in FIG. 4.

In FIGS. 3, 4 and 5, a reciprocal member 51 made of brass is slidably engaged with a brass-made threshold member 52, which is to be fixed on the recessed area 45 of the casing 40 through a plastic plate 53 as well shown in FIG. 3, but the both 51 and 52 are so constructed that the both members are not pulled apart upward. More specifically, the reciprocal member 51 has elongated grooves 51a and 51d whereas the threshold member 52 has corresponding elongated projections 52a and 52b so that the projections 52a, 52b are snugly and slidably fit in the corresponding grooves 51a and 51b. The reciprocal member 51 has an L-shaped member 54 made of comparatively resilient material as synthetic resin at one end, and a concave (not shown) in which a coiled spring 55 is partly received. The other end of the coiled spring 55 is received by the wall 46 of the casing 40 such that the spring 55 is disposed between the reciprocal member 51 and the wall 46. A blade-holder 56 is connected to the reciprocal member 51 by means of bolts 57a, 57b and butterfly nuts 58a, 58b as illustrated in FIG. 4. A blade 59 is firmly held on the side of the blade-holder 56 by means of a plate 60 and fixing members 61a and 61b, as shown in FIGS. 4 and 5. A thickness adjustment member 62 has a flat surface 63 and a lower portion 64 which is uniform in thickness in the whole area thereof. The lower portion 64 has a pair of holes 65a, 65b through which butterfly bolts 66a, 66b are inserted to engage with threaded holes 67a and 67b so that the thickness adjustment member 62 is removably connected to the casing 45 of the pressing device 22 (FIG. 3). In order to obtain desirable thickness, as thin as 0.5 mm or as thick as 1.0 mm or the like, of peeled vegetable flesh which is in the form of a continuous thin tape, several thickness adjustment members 62 are prepared differing the thickness of the lower portion 64 of each of the members. When a thickness adjustment member 62 having a relatively thin lower portion 64 is used, a relatively thick flesh of vegetable will be obtained whereas relatively thick lower portion 64 of the thickness adjustment presents a relatively thin flesh of vegetables.

Figure 6:
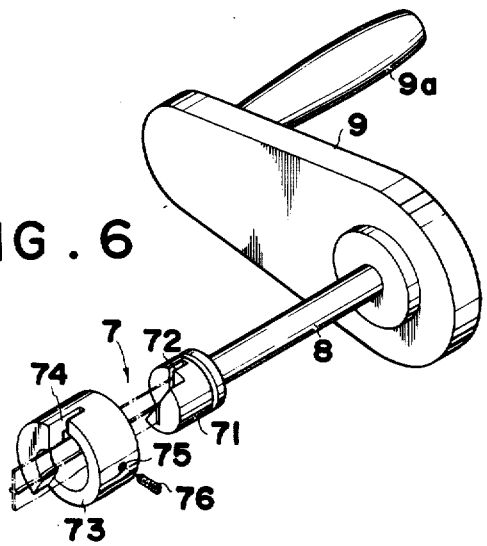
FIGS. 6 and 7 show preferred construction of securing devices for a skewer.
Figure 7:
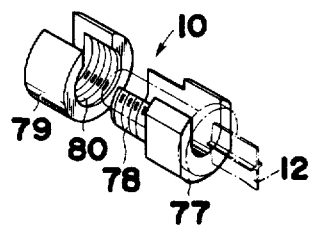

FIGS. 6, 7 and 8 show preferred specific construction of the first securing device 7, the second securing device 10, and the skewer 12, respectively. In FIG. 6, a skewer-end receiving member 71 of steel is fixed to the end of the driving shaft 8. The member 71 is cylindrical and has a slot 72, which goes through the axis there of and wide and deep enough to hold the end portion of the skewer 12. Further the member 71 is such formed that an end portion thereof is cut away diagonally to the depthwise direction of the slot 72. A cylindrical locking member 73 of plastic materials has a projection integrally formed which projects, at one end of the member 73, toward the center of the member 73 as well illustrated. Also, the cylindrical locking member 73 has a slot 74 which is as wide as the slot 72 of the skewer-end receiving member 71. A threaded hole 76 is disposed on the side of cylindrical cover member 73 and a screw 76 is provided for fixing the locking member 73 on the skewer receiving member 71 when the skewer is fully inserted into the slots 72, 74. In FIG. 7, a haft-receiving member 77, which is to receive the haft portion of the skewer 12, is U-shaped and has a threaded groove 78 while a locking member 79 is also U-shaped and has a threaded groove 80 which is engaged with the threaded groove 78 of the haft-receiving member, so that the haft portion of the skewer received by the haft-receiving member 77 may be locked by turning the locking member 79. In FIG. 8, the skewer 12 has an elongated principal portion 12a having a sharp end, a cylindrical haft portion 12b, and a brim portion 12c which is formed integrally between the principal portion 12a and the haft portion 12b. The skewer 12 further has elongated projections 12d on the surfaces of the principal portion 12a except the area of sharp end as illustrated. The elongated projections 12d prevents an idle running of the skewer but assures a desired rotation of a vegetable together with the skewer 12.

An operation of the apparatus which has been described with reference to the drawings will be described with reference mainly to FIGS. 1, 2 and 3. First, a vegetable as raddish (not illustrated), preferably a cylindrical raddish, is cut to the predetermined length and the skewer 12 is inserted through the axis of the raddish until the side of the raddish comes close to the brim portion 12c of the skewer 12. The skewer should be straightly inserted through the center or axis of the vegetable. Then, the lever 29, which has been laid, is rotated or erected with a finger-tip operation to be locked by the stopper 28. When the lever 29 is being rotated to be locked, the toothed wheel 36 is rotated while being engaged with the rack 25 of base plate 5, thereby winding the clockwork spring 33, and the pressing device 22 (FIG. 3) together with the cuttting device 21 are delivered toward the front plate 3 (FIG. 1) against the force of the clockwork spring 33. After the lever 29 is locked to allow the devices 21 and 22 move toward the front plate to make an air space large enought to position the vegetable, the skewer 12 which has been inserted through the vegetable is secured by the first and second securing device 7 and 10 by inserting the shapened end portion into the slot 72 (FIG. 6) and the haft portion 12b into the haft-receiving member 77 (FIG. 7). After the skewer 12 is snugly positioned, the skewer is secured by turning the locking members 74 and 79. Then the screw 76 is used to fully hold the skewer 12.

After the skewer as well as the vegetable is secured as described, the lever member 29 is unlocked to allow the blade 59 and the thickness adjustment member 62 to be in close contact with the vegetable by the force of the clockwork spring 33. Then, the handle 9 is rotated manually to achieve a rotation of the vegetable. Rotation of the vegetable produces a thin flesh of vegetable since the cutting device 21 is uniformly pressed onto the vegetable by means of the clockwork spring 33. Four guide rollers 32a, 32b, 32c and four wheels 46a, 46b (FIG. 3) allow a smooth movement of the pressing device 22 which has the cutting device 21 thereon.

Figure 9A:
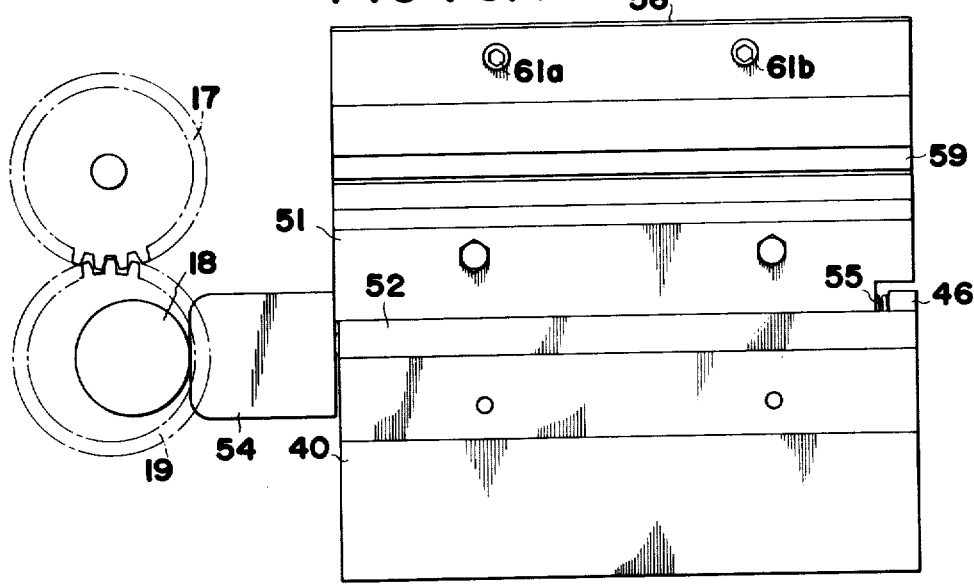
FIGS. 9A and 9B shows the reciprocal movement of a reciprocal member of the present apparatus.
Figure 9B:
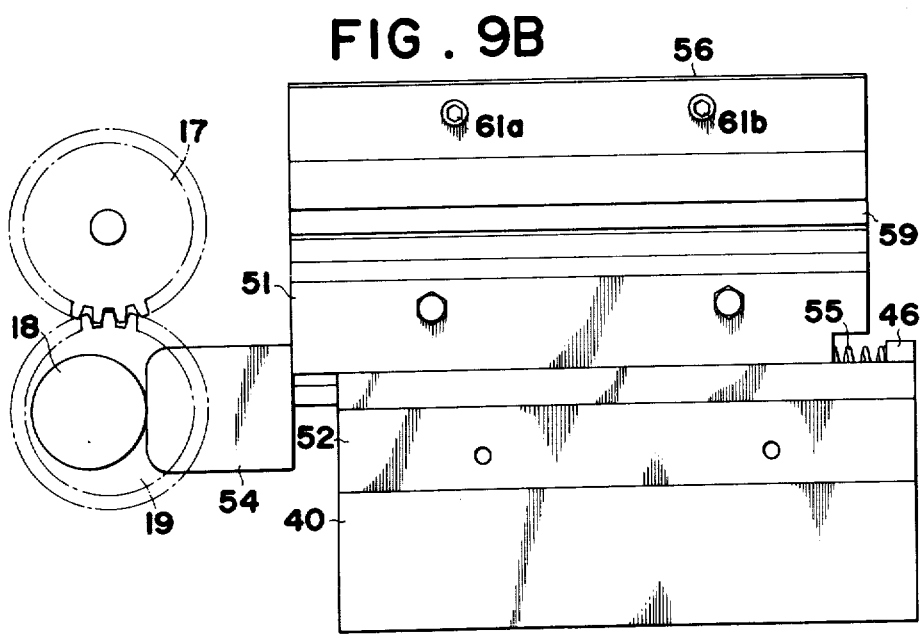

A movement of the cutting device 21 in the lateral direction, namely in the longitudinal direction of the skewer 12, will be described below with reference to FIGS. 1, 4 9A and 9B. In the drawing, when the handle 9(FIG. 1) is rotated in the clockwise direction, the eccentric roller 18 is rotated by way of the bevel gear construction 13, 14 and toothed wheels 17, 19. The rotation of the eccentric roller 18 allows the reciprocate movement of the cutting device 21. More specifically, as illustrated in FIGS. 9A and 9B, when the eccentrical roller 18 is rotated so that the thicker portion of the roller 18 comes to contact with the L-shaped member 54 of the reciprocal member 51, the reciprocal member 51 is pressed to slide on the threshold 52 toward the wall 46, against the force of the coiled spring 55, as illustrated in FIG. 9A. On the other hand, when the eccentrical roller 18 is rotated so that the thinner portion of the roller 18 comes to contact with the L-shaped member 54 of the reciprocal member 51, the reciprocal member 51 is slided toward the left-hand side of the drawing by the force of the spring 55, keeping the sliding contact between the eccentrical roller and the L-shaped member 54. Thus, a rotation of the eccentrical roller 18 and a force of the coiled spring 55 present a desired reciprocal movement of the cutting device. In this embodiment, one rotation of the handle 9 presents two reciprocal movements of the cutting device 21 because the bevel gear composed of the toothed wheels 13 and 14 is in the gear ratio of 2:1, which ratio, the applicant has found in trial and error, is desirable in producing a smooth surfaced tape-like flesh of vegetables and in driving operation of the handle 9, In FIGS. 9A and 9B, reference numerals 17 and 19 refer to the toothed wheels which are illustrated well in FIG. 1, and reference numerals 40, 51, 52, 56 and 59 are casing of the pressing device, threshold member, reciprocal member cutting device and blade, respectively, which have been described with reference to FIG. 4.

FIG. 10 shows a modified construction which allows the reciprocal movement of the cutting device, in which modifed construction a cam mechanism is applied in place of the cooperation of the bevel gear construction 13, 14, toothed wheels 17, 19 and eccentrical roller 18. In the modified construction, a gear 86 and a pinion 81 in the gear ratio of 2:1 are provided. The gear 86 is axially connected to a cylindrical cam member 82 which has a pin 83 slidably engaged with the groove 84 of the cam member 82. The pin 83 is fixed on a T-shaped member 85 which directly contacts, and pushes the reciprocal member 51 (FIG. 4) against the coiled spring 55. In order that the T-shaped member may push the reciprocal member 51 from the beginning to the end of the cutting operation, a head portion 85a of the T-shaped member 85 should be long enough.

The operation of the second embodiment described with reference to FIG. 10 presents a similar operational manner as that of the first embodiment which was described with reference to FIGS. 1 through 9B.

Though the present invention has been described with respect to the preferred embodiments thereof, the present invention is not limited to the description thereof but any modifications and alterations may be made within the scope of the present invention.

What is claimed is:

1. An apparatus for peeling a flesh of vegetables to produce a continuous flesh in the form of a thin tape, comprising:
   1. a housing having a generally right angle configuration;
   2. an elongated member which is to be inserted through the vegetable to secure said vegetable while it is being rotated and peeled;
   3. means for rotating said elongated member together with the vegetable, said rotating means having a handle;
   4. means for holding and removably securing the ends of said elongated member to the housing, allowing said elongated member to rotate;
   5. a cutting device which has a longitudinal blade;
   6. means for reciprocating said cutting device in the longitudinal direction of said blade, said reciprocating means having a longitudinal base which has a recess in the longitudinal direction thereof, a slidable block which is slidably secured by said longitudinal base and is connected to said cutting device, a coil spring disposed between the slidable block and a rotary member which is communicated with, and driven by, said rotating means so that rotation of the rotary member reciprocates said slidable block against the force of said coil spring the rotation of said rotary member and the force of said coil spring providing the reciprocal movement of said cutting device; and
   7. means for uniformly pressing said blade onto the vegetable which is to be continuously peeled, the blade being connected to said cutting device which slides longitudinally along said recess, said pressing means having a movable casing, a shaft rotatably supported by said movable casing, a toothed wheel connected to said shaft, a rack fixedly disposed on said housing and engaged with said toothed wheel, and a spring which is connected at its inner end to said shaft and connected at its outer end to said movable casing, the force of said spring causing the blade to be in close contact with said vegetable, whereby the driving of said rotating means rotates the said elongated member as well as the vegetable, simultaneously reciprocates the cutting device and provides uniform pressure on said vegetable as said movable casing moves along said rack by means of said toothed wheel, thereby forming a continuous flesh in the form of a thin tape.

2. An apparatus as claimed in claim 1, wherein said apparatus comprises an adjustment member which is removably connected to said movable casing of said pressing means to adjust the distance of air space between said blade and the surface of the vegetable to be peeled, thereby changing the thickness of the peeled flesh of a vegetable.

3. An apparatus as claimed in claim 1, wherein said rotary member of the reciprocating means is an eccentric roller, said eccentric roller being connected to said handle through a bevel gear construction which is in the gear ratio of 2:1 so that one rotation of said handle makes two rotations of said eccentric roller.

4. An apparatus as claimed in claim 1, wherein said rotary member of said reciprocating means is a cam construction having a grooved cam roller, said cam construction being connected to said handle through toothed wheels and having a T-shaped member which has a pin slidably connected said groove cam roller, the aforesaid toothed wheels being in the gear ratio of 2:1 so that one rotation of said rotating means makes two rotations of the cam roller.

* * * * *